(12) United States Patent
Kloppenburg

(10) Patent No.: US 10,402,739 B2
(45) Date of Patent: Sep. 3, 2019

(54) METHOD AND DEVICE FOR DETERMINING A DATA-BASED FUNCTIONAL MODEL

(71) Applicant: Robert Bosch GmbH, Stuttgart (DE)

(72) Inventor: Ernst Kloppenburg, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 574 days.

(21) Appl. No.: 15/100,432

(22) PCT Filed: Oct. 13, 2014

(86) PCT No.: PCT/EP2014/071843
§ 371 (c)(1),
(2) Date: May 31, 2016

(87) PCT Pub. No.: WO2015/082107
PCT Pub. Date: Jun. 11, 2015

(65) Prior Publication Data
US 2016/0300152 A1    Oct. 13, 2016

(30) Foreign Application Priority Data
Dec. 3, 2013   (DE) .................... 10 2013 224 698

(51) Int. Cl.
*G06N 20/00*     (2019.01)
*G06N 7/00*      (2006.01)

(52) U.S. Cl.
CPC ............ *G06N 7/005* (2013.01); *G06N 20/00* (2019.01)

(58) Field of Classification Search
CPC ............................... G06N 7/005; G06N 20/00
See application file for complete search history.

(56) References Cited

U.S. PATENT DOCUMENTS

2009/0150126 A1    6/2009   Sellamanickam et al.

OTHER PUBLICATIONS

International Search Report dated Jun. 3, 2015, of the corresponding International Application PCT/EP2014/071843 filed Oct. 13, 2014, 4 pages.
Dejan Petelin et al., "Adaptive Importance Sampling for Bayesian Inference in Gaussian Process models", Preprints of the 19th World Congress, The International Federation of Automatic Control, Cape Town, South Africa, XP055191588, Aug. 24, 2014, pp. 5011-5016.
Radford M. Neal, "Regression and Classification Using Gaussian Process Priors", Bayesian Statistics 6, XP055191579, Jan. 1, 1998, pp. 475-501.

(Continued)

*Primary Examiner* — Austin Hicks
(74) *Attorney, Agent, or Firm* — Norton Rose Fulbright US LLP; Gerard Messina

(57) ABSTRACT

A method for creating a Gaussian process model as a data-based functional model for an output quantity that is to be modeled, based on training data in an input data space, including providing training data having training data points and output values, assigned to the training data points, of one or more output quantities; ascertaining a point density that is a function of the position of the training data points in the input data space; ascertaining a length scale function for each input quantity of the training data as a function of the point density; and generating a Gaussian process model from the training data and the output data of the output quantity to be modeled, based on the ascertained length scale functions.

10 Claims, 3 Drawing Sheets

(56) References Cited

OTHER PUBLICATIONS

Peter Mills, "Efficient Statistical Classification of Satellite Measurements", International Journal of Remote Sensing, vol. 32, No. 21, XP055191205, Nov. 10, 2011, pp. 6109-6132.

Mathieu Balesdent et al., "Kriging-Based Adaptive Importance Sampling Algorithms for Rare Event Estimation", Structural Safety, vol. 44, XP055191584, Sep. 1, 2013, pp. 1-10.

Iain Murray et al., "Slice Sampling Covariance Hyperparameters of Latent Gaussian Models", Arxiv.org, Cornell University Library, XP080481778, Oct. 28, 2010, pp. 1-9.

Ryan Prescott Adams et al., "Nonparametric Bayesian Density Modeling with Gaussian Processes", Arxiv.org., Cornell University Library, XP080384319, Dec. 24, 2009, pp. 1-26.

METHOD AND DEVICE FOR DETERMINING A DATA-BASED FUNCTIONAL MODEL

FIELD

The present invention relates to methods for creating data-based functional models for modeling physical units. In particular, the present invention relates to measures for taking into account non-uniformly distributed training data points in the creation of a Gaussian process model as a data-based functional model.

BACKGROUND INFORMATION

In the measurement of a physical unit in order to generate training data for creating a model describing the physical unit, it is often the case that stronger variations of an output quantity occur in sub-areas of the input data space than in other areas. Therefore, in the sub-areas in which these stronger variations of the output quantity occur, as a rule more measurement points are provided, i.e. a higher measurement point density is present there. As a result, the resulting training data ultimately show clusters of training data points in the relevant sub-areas of the input data space.

The training data can be used to create a data-based functional model, in particular a Gaussian process model. While it is standardly to be assumed that a higher density of training data leads to higher precision of a model, in particular a data-based functional model, in the generation of a Gaussian process model this is not automatically the case. It is true that in the creation of a Gaussian process model only a few modeling assumptions are made, but a standard basic assumption is that the curve of the modeling function is equally smooth over the entire area of definition. In other words, over the entire area of definition the Gaussian process model has locally constant length scales. This can have the result that a local strong variation is interpreted as a measurement error, and is thus removed from the modeled curve of the functional model by smoothing.

In the literature, conventional approaches are expand the Gaussian process model with locally dependent length scales. For this purpose, for the length scales an arbitrary linear or non-linear function over the input data space can be indicated. In addition, functions parameterized for the length scales can be specified, and the parameters of these parameterized length scale functions can be estimated from the measurement training data using statistical methods. However, these approaches are very computing-intensive and are not suitable given higher-dimensional training data. In addition, parameterized length scale functions require a larger number of training data points because the information concerning the curve of the length scales has to be extracted from the training data. The complexity of the above approaches increases considerably with the number of dimensions of the input data space (in particular because integrals have to be numerically solved).

SUMMARY

According to the present invention, a method is provided for creating a Gaussian process model as a data-based functional model according to claim 1, and a device and a computer program are provided.

According to a first aspect, an example method is provided for creating a Gaussian process model as a data-based functional model for an output quantity that is to be modeled, based on training data in an input data space, the method including the following steps:
providing training data having training data points and output values, assigned to the training data points, of one or more output quantities;
ascertaining a point density that is a function of the position of the training data points in the input data space;
ascertaining a length scale function for each input quantity of the training data as a function of the point density; and
generating a Gaussian process model from the training data and from the output values of the output quantity to be modeled, based on the ascertained length scale functions.

Conventional Gaussian process models model a system behavior based on hyperparameters, namely the variance $\sigma_f$ and the length scales, which are constant for each dimension of the input data space, and having a parameter vector in which the hyperparameters and the values of the output quantity of the training data are taken into account. Due to the constant length scales, in particular stronger variations within a sub-region of the input data space are not adequately taken into account. The function of the length scales in Gaussian process models is explained in detail in particular in C. E. Rasmussen et al., "Gaussian Processes for Machine Learning," MIT Press, 2006, ISBN 026218253X; www.GaussianProcess.org/gpml.

The example method described above circumvents these problems of high complexity of the calculation for providing varying length scales in that the density of the training data points in the sub-areas of the input data space are used as information for specifying the length scales. This results in an expanded Gaussian process model that can take into account stronger variations in sub-areas of the input data space.

In addition, the provision of training data can include that the point density of training data points of the training data is increased in a sub-area of the input data space if the variation in the values of the output quantity is greater than average.

In particular, a greater-than-average variation of the values of the output quantity can be determined by comparing a variance of the training data points in the sub-area with an average variance of the training data points in the overall input data space.

It can be provided that the point density is provided as a function over the input data space formed by the training data points.

According to a specific embodiment, the point density can be indicated as a number of training data points in a sub-area of the input data space.

In addition, for the generation of the Gaussian process model a covariance function can be used having variable length scales of the length scale functions, in particular in the form of a Gibbs covariance function.

It can be provided that the length scale functions are proportional to a reciprocal value of the Dth root of the point density that is a function of the position of the training data points, where D is the dimension of the input data space.

According to a further aspect, an example device is provided for creating a Gaussian process model as a data-based functional model for an output quantity that is to be modeled based on training data in an input data space, the device being fashioned:
to ascertain a point density that is a function of the position of the training data points in the input data space, the training data being provided having the training data points and output values, assigned to the training data points, of one or more output quantities;

to ascertain a length scale function for each input quantity of the training data as a function of the point density; and to generate a Gaussian process model from the training data and from the output values of the output quantity to be modeled, based on the ascertained length scale functions.

BRIEF DESCRIPTION OF THE DRAWINGS

Below, specific embodiments are explained in more detail on the basis of the figures.

DETAILED DESCRIPTION OF EXAMPLE EMBODIMENTS

Figure 1:
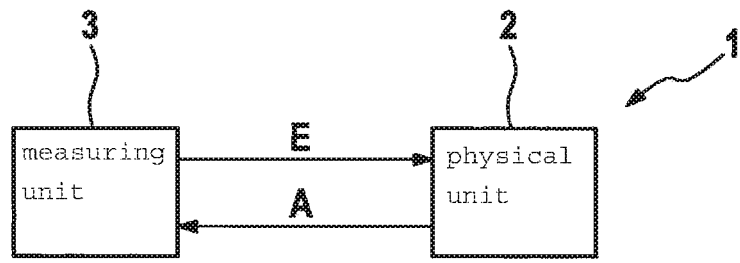
FIG. 1 shows a schematic representation of a test system for recording measurement or training data in order to create from these data a data-based functional model for modeling the physical unit.

FIG. 1 shows a schematic representation of a test system 1 fashioned for measuring a physical unit 2. A physical unit 2 can for example correspond to an internal combustion engine of a motor vehicle, or to sub-systems thereof. A measuring unit 3 controls physical unit 2 with control quantities E that lead to particular operating points or operating states of physical unit 2. In addition, the controlling of physical unit 2 results in one or more output quantities A that can also be measured and whose corresponding measurement values are communicated to measuring unit 3.

Depending on the modeling goal, control quantities E and the operating quantities of the operating state resulting therefrom in physical unit 2, as input quantities for the training data as well as one or more further operating quantities, can be one or more output quantities A assigned to the training data. During a measurement of physical unit 2, values of the input quantities acquired by measuring unit 3 form a training data point to which a corresponding value of output quantities A, or a value of one of the output quantities A, is assigned.

Generally, for the complete measurement of physical unit 2 the operating states are varied over a large range of operating quantities in order in this way to achieve a maximally space-filling covering of the input data space by the training data points. When moving through the operating states in order to acquire the training data, regions of the input data space can be traveled through in which locally strong variations of output quantities A can occur. These locally stronger variations can be determined for example through comparison of locally determined variances of the training data points with an average variance of all training data points in the input data space. In order to map these variations in the training data, in the corresponding sub-regions frequently the distances between the operating quantities defining the operating states, or between the input quantities, are reduced, so that a local clustering of training data points can occur in the regions of stronger local variations of output quantities A.

In order to create models of physical units 2, data-based methods can be used in order to create non-parametric data-based functional models. In particular, frequently methods are used for creating Gaussian process models.

The use of non-parametric data-based functional models is based on a Bayesian regression method. The basic principles of Bayesian regression are described for example in C. E. Rasmussen et al., "Gaussian Processes for Machine Learning," MIT Press 2006. Bayesian regression is a data-based method based on a model. To create the model, training data points of the training data, and associated output values of the one or of the several output quantities, are required. The creation of the model takes place using sampling point data that correspond completely or partly to the training data or are generated therefrom. In addition, abstract hyperparameters and a parameter vector are determined that parameterize the space of the model functions and effectively weight the influence of the individual sampling points on the later model prediction.

The abstract hyperparameters are determined through an optimization method. A possibility for such an optimization method is an optimization of a marginal likelihood p(Y|H, X). Marginal likelihood p(Y|H,X) describes the plausibility of the measured y values of the training data, represented as vector Y, given model parameters H and the X values of the training data. In the model training, p(Y|H,X) is maximized by seeking suitable hyperparameters that result in a curve of the modeling function determined by the hyperparameters and the training data and that map the training data as precisely as possible. In order to simplify the calculation, the logarithm of p(Y|H,X) is maximized, because the logarithm does not change the continuity of the plausibility function.

The calculation of a Gaussian process model takes place using input values $\tilde{u}_d$ for a test point u (input quantity vector), first standardly normed corresponding to the following equation:

$$u_d = \frac{\tilde{u}_d - (m_x)_d}{(s_x)_d}.$$

Here $m_x$ corresponds to the mean value function relating to a mean value of the input values of the sampling point data, $s_y$ is the variance of the input values of the sampling point data, and d is the index for the individual dimensions of test point u.

As a result of the creation of the non-parametric data-based functional model, the following is obtained:

$$v = \sum_{i=1}^{N} (Q_y)_i \sigma_f \exp\left(-\frac{1}{2} \sum_{d=1}^{D} \frac{((x_i)_d - u_d)^2}{l_d}\right).$$

The modeling value v ascertained in this way is normed using an output norming, according to the equation:

$$\bar{v} = v s_y + m_y.$$

Here, v corresponds to a normed modeling value (output value) at a normed test point u (input quantity vector having dimension D), $\bar{v}$ is a (non-normed) modeling value (output value) at a (non-normed) test point $\bar{u}$ (input quantity vector having dimension D), $x_i$ is a sampling point of the sampling point data, N is the number of sampling points of the sampling point data, D is the dimensionality of the input data/training data/sampling point data space, and $l_d$ and $\sigma_f$ are the hyperparameters, i.e. the dimension-dependent length scales and a variance, from the model training. Parameter vector $Q_y$ is a quantity calculated from the hyperparameters and from the training data. In addition, $m_y$ is the mean value function relating to a mean value of the output values of the sampling point data, and $s_y$ is the variance of the output values of the sampling point data.

The input and output norming is carried out because the calculation of the Gaussian process model typically takes place in a normed space.

In order to take into account the problem of the local occurrence of stronger variations of the output quantities, varying length scales are provided for the above-described general equations of the Gaussian process models. The length scales vary as a function of the input quantities, or as a function of the location or region within the input data space spanned by the training data. Previously known methods for taking into account the above-described problem through length scale functional models are expensive, and it is therefore provided to adapt the length scales for each dimension of the input quantities as a function of a density of the training data points within the input data space. In particular, the Gaussian process model is modified in such a way that as covariance function a covariance function is used having variable length scales, for example in the form of a Gibbs covariance function.

In addition to the method for creating the Gaussian process model, an estimation method is used that can estimate the local point density for each point X in the input data space. The point density p(X) is proportional to the number of points per spatial unit in the d-dimensional input data space in the vicinity of X. Various algorithms are conceivable as estimation methods for the point density. For example, in general a method is known for kernel density estimation, for example from the publication P. Mills, "Efficient Statistical Classification of Satellite Measurements," 2011, International Journal of Mode Sensing 32 (21). As length scale function for each axis direction, i.e. for each dimension of the input data space, a function of the following form is now used:

$$l_d(x) = l_d \cdot p(x)^{(-\frac{1}{D})}.$$

That is, the length scale function $l_d(x)$ is a product of a scalar factor for each input dimension and a term that is based on the estimation of the local point density p(X). This term is the Dth root (where D=the number of dimensions of the input data space) of the reciprocal value of the point density, and the scale factors $l_d$ are estimated from the training data during the hyperparameter optimization, so that locally a different characteristic is possible for different axial directions, i.e. for the different dimensions of the input data space, as is also the case in the conventional Gaussian process model.

Figure 2:
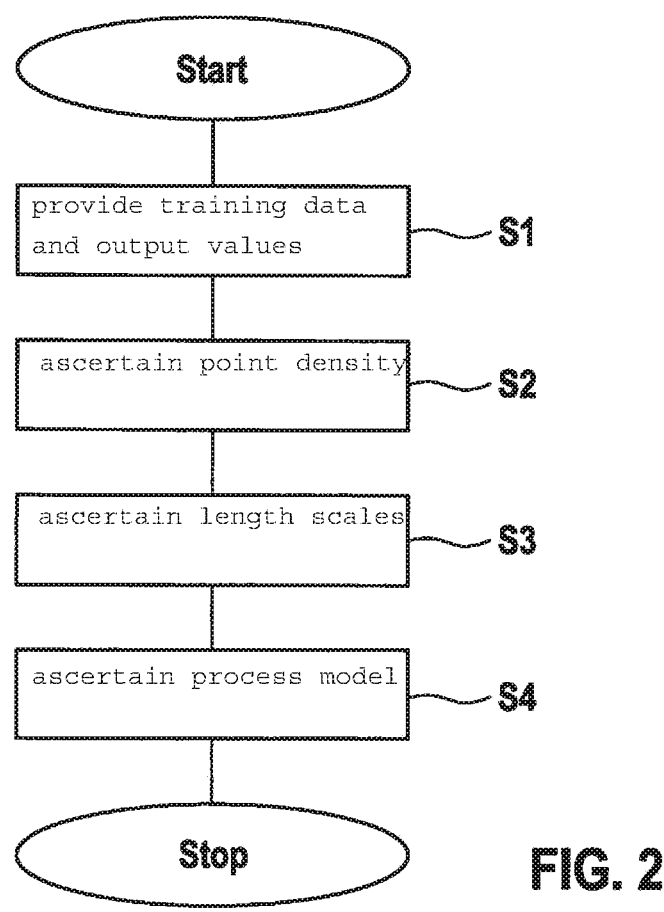
FIG. 2 shows a flow diagram illustrating a method for creating a Gaussian process model having variable length scales.

Using the flow diagram of FIG. 2, the method is described for ascertaining a Gaussian process model that takes into account locally stronger variations. In step S1, for this purpose training data and output values, corresponding to the training data points, of the one or more output quantities are provided.

In step S2, the point density of the training data points in the input data space is now ascertained as described above, and in step S3 there takes place the ascertaining of the length scales for each dimension, i.e. for each input quantity, as a function of the point density, e.g. corresponding to the above equation.

In step S4, the Gaussian process model is now ascertained based on the training data, the output values of the one or more output quantities, and based on the length scales specified according to step S3.

Figure 3A:
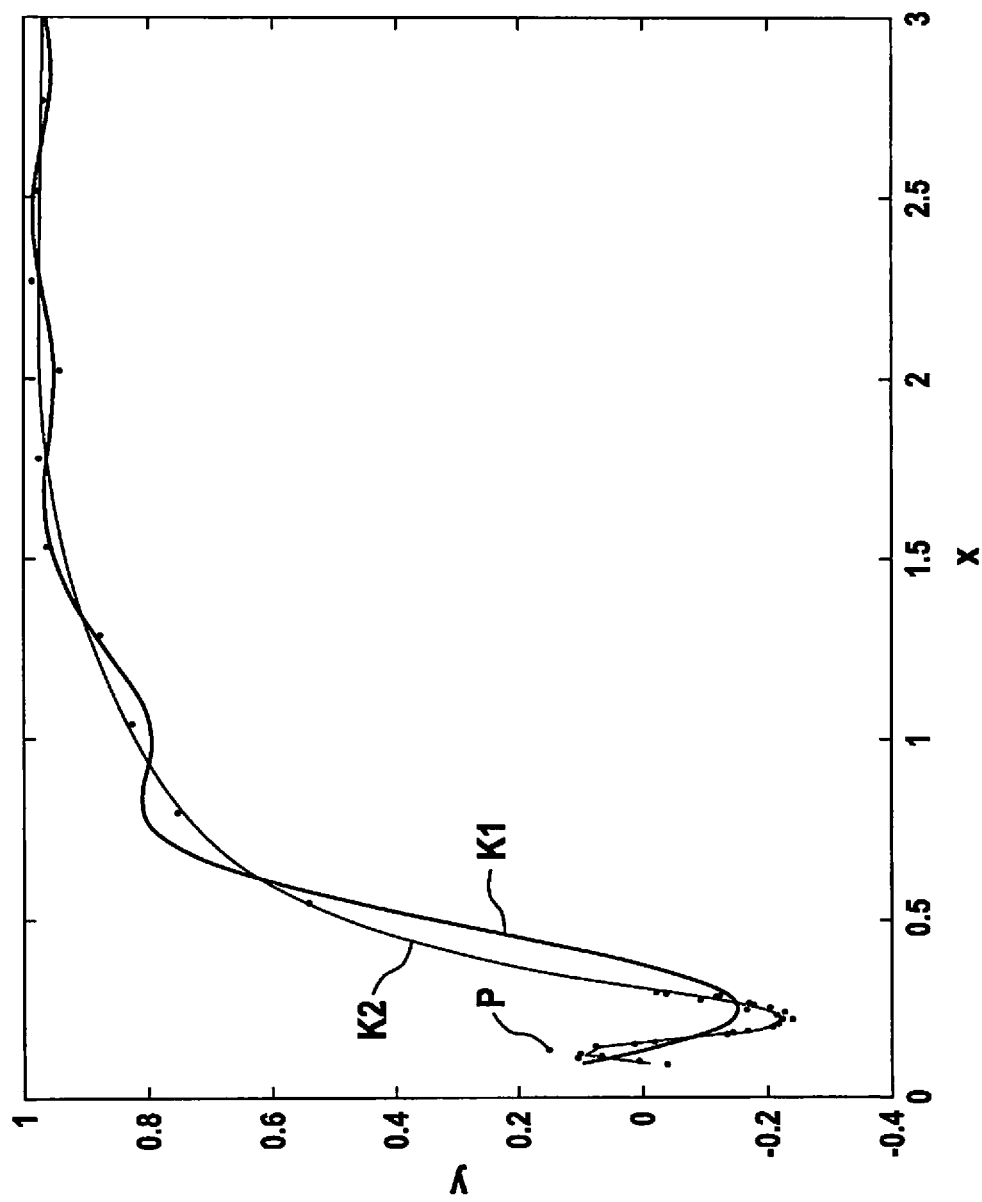
FIGS. 3a and 3b show representations of modeled curves of Gaussian process models that were created with and without taking into account a local point density of the training data points, as well as a curve of the local point density used as a basis.
Figure 3B:
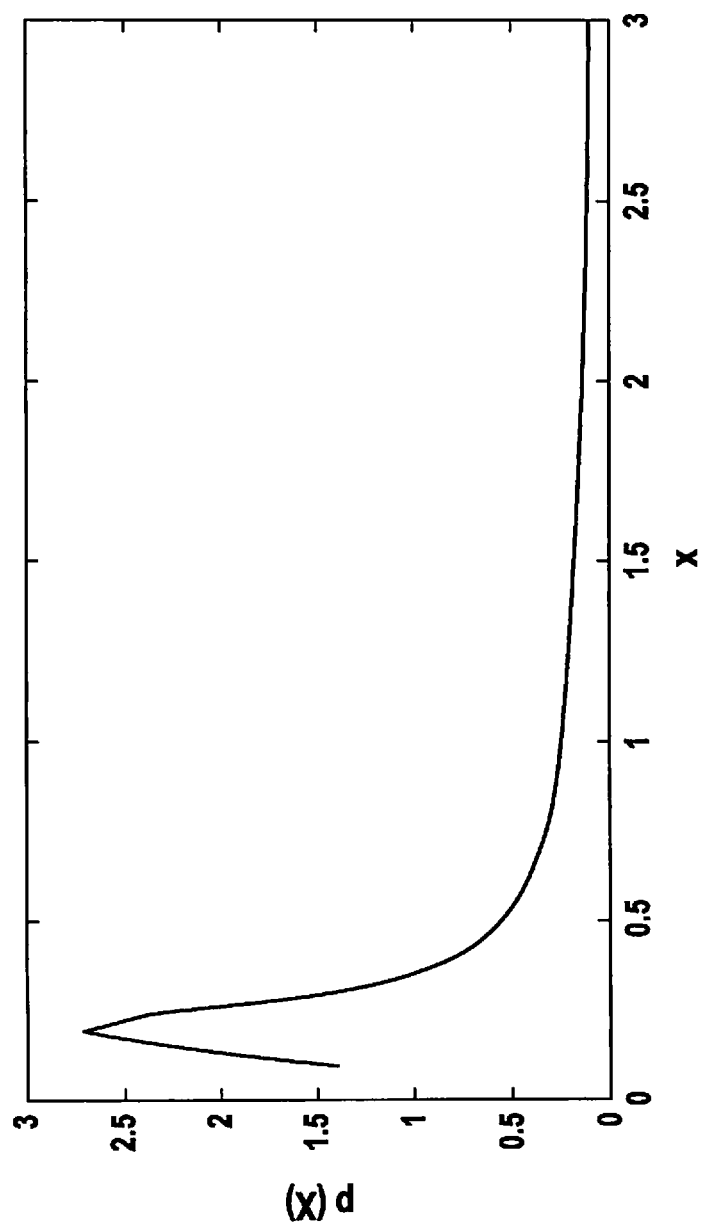

In FIGS. 3a and 3b, as an example of a two-dimensional measurement data space a data-based functional model is shown graphically in the form of a Gaussian process model and in the form of a Gaussian process model taking into account a density estimation. The values of training data P (training data points) vary particularly strongly in the range 0<x<0.5. Therefore, there as well the point density of training data points P was increased.

The curve of point density p(x) for the training data shown in FIG. 3a is shown in FIG. 3b. In FIG. 3a, model curves are shown that were created using a respective Gaussian process model. First curve K1 shows a conventional Gaussian process model having constant length scales. Second curve K2 shows a Gaussian process model that takes into account the locally dependent length scales. It can be seen that second curve K2 can more precisely reproduce the curve of the training data points.

What is claimed is:

1. A method for creating a Gaussian process model as a data-based functional model for an output quantity that is to be modeled, based on training data in an input data space, the method comprising:
    providing training data having training data points and output values, assigned to the training data points, of at least one output quantity;
    ascertaining a point density that is a function of a position of the training data points in the input data space;
    ascertaining a length scale function for each input quantity of the training data as a function of the point density; and
    generating a Gaussian process model from the training data and the output values of the output quantity to be modeled, based on the ascertained length scale functions;
    wherein a covariance function having variable length scales of the length scale functions, in the form of a Gibbs covariance function, is used to generate the Gaussian process model.

2. The method as recited in claim 1, wherein the providing of training data includes increasing the point density of training data points of the training data in a sub-region of the input data space if a variation of the values of the output quantity is greater than average.

3. The method as recited in claim 2, wherein a greater-than-average variation of the values of the output quantity is determined through comparison of a variance of the training data points in the sub-region with an average variance of the training data points in the overall input data space.

4. The method as recited in claim 2, wherein the point density is provided as a function over the input data space formed by the training data points.

5. The method as recited in claim 4, wherein the point density is indicated as a number of training data points in a sub-region of the input data space.

6. The method as recited in claim 5, wherein the length scale functions are proportional to a reciprocal value of the Dth root of the point density that is a function of the location of the training data points, D being a dimensionality of the input data space.

7. A method for creating a Gaussian process model as a data-based functional model for an output quantity that is to be modeled, based on training data in an input data space, the method comprising:
provided training data having training data points and output values, assigned to the training data points, of at least one output quantity;
ascertaining a point density that is a function of a position of the training data points in the input data space;
ascertaining a length scale function for each input quantity of the training data as a function of the point density; and
generating a Gaussian process model from the training data and the output values of the output quantity to be modeled, based on the ascertained length scale functions;
wherein the providing of training data includes increasing the point density of training data points of the training data in a sub-region of the input data space if a variation of the values of the output quantity is greater than average;
wherein the point density is provided as a function over the input data space formed by the training data points;
wherein the point density is indicated as a number of training data points in a sub-region of the input data space;
wherein a covariance function having variable length scales of the length scale functions, in the form of a Gibbs covariance function, is used to generate the Gaussian process model.

8. A device for creating a Gaussian process model as a data-based functional model for an output quantity to be modeled, based on training data in an input data space, the device being designed to:
ascertain a point density that is a function of the position of the training data points in the input data space, the training data being provided having the training data points and output values, assigned to the training data points, of at least one output quantity;
ascertain length scale functions for each input quantity of the training data as a function of the point density; and
generate a Gaussian process model from the training data and from the output values of the output quantity to be modeled, based on the ascertained length scale functions;
wherein a covariance function having variable length scales of the length scale functions, in the form of a Gibbs covariance function, is used to generate the Gaussian process model.

9. A non-transitory electronic storage medium storing a computer program for creating a Gaussian process model as a data-based functional model for an output quantity that is to be modeled, based on training data in an input data space, the computer program, when executed by a control device, causing the control device to perform:
providing training data having training data points and output values, assigned to the training data points, of at least one output quantity;
ascertaining a point density that is a function of a position of the training data points in the input data space;
ascertaining a length scale function for each input quantity of the training data as a function of the point density; and
generating a Gaussian process model from the training data and the output values of the output quantity to be modeled, based on the ascertained length scale functions;
wherein a covariance function having variable length scales of the length scale functions, in the form of a Gibbs covariance function, is used to generate the Gaussian process model.

10. An electronic control device that has an electronic storage medium storing a computer program for creating a Gaussian process model as a data-based functional model for an output quantity that is to be modeled, based on training data in an input data space, the computer program, when executed by the control device, causing the control device to perform:
providing training data having training data points and output values, assigned to the training data points, of at least one output quantity;
ascertaining a point density that is a function of a position of the training data points in the input data space;
ascertaining a length scale function for each input quantity of the training data as a function of the point density; and
generating a Gaussian process model from the training data and the output values of the output quantity to be modeled, based on the ascertained length scale functions;
wherein a covariance function having variable length scales of the length scale functions, in the form of a Gibbs covariance function, is used to generate the Gaussian process model.

* * * * *